United States Patent
Crivat et al.

(10) Patent No.: US 7,788,200 B2
(45) Date of Patent: Aug. 31, 2010

(54) GOAL SEEKING USING PREDICTIVE ANALYTICS

(75) Inventors: Ioan Bogdan Crivat, Redmond, WA (US); C. James MacLennan, Redmond, WA (US); Raman S. Iyer, Redmond, WA (US)

(73) Assignee: Microsoft Corporation, Redmond, WA (US)

( * ) Notice: Subject to any disclaimer, the term of this patent is extended or adjusted under 35 U.S.C. 154(b) by 396 days.

(21) Appl. No.: 11/670,656

(22) Filed: Feb. 2, 2007

(65) Prior Publication Data

US 2008/0189237 A1    Aug. 7, 2008

(51) Int. Cl.
    *G06F 17/00*    (2006.01)
(52) U.S. Cl. .......................... 706/46; 715/212
(58) Field of Classification Search .............. 707/2; 706/46; 715/212
    See application file for complete search history.

(56) References Cited

U.S. PATENT DOCUMENTS

| | | | |
|---|---|---|---|
| 5,418,902 A | 5/1995 | West et al. | |
| 6,112,126 A | 8/2000 | Hales et al. | |
| 6,405,179 B1 | 6/2002 | Rebane | |
| 6,477,471 B1 | 11/2002 | Hedstrom et al. | |
| 6,694,301 B1 * | 2/2004 | Heckerman et al. | 706/45 |
| 6,954,756 B2 * | 10/2005 | Arning et al. | 707/101 |
| 7,089,222 B1 * | 8/2006 | Lannert et al. | 706/47 |
| 7,136,785 B2 | 11/2006 | Mast et al. | |
| 7,464,008 B2 * | 12/2008 | Adar et al. | 703/2 |
| 7,490,085 B2 * | 2/2009 | Walker et al. | 707/10 |
| 7,499,897 B2 * | 3/2009 | Pinto et al. | 706/46 |
| 7,512,583 B2 * | 3/2009 | Benson et al. | 706/59 |
| 2001/0020236 A1 * | 9/2001 | Cannon | 707/1 |
| 2001/0041995 A1 | 11/2001 | Eder | |
| 2003/0088540 A1 * | 5/2003 | Edmunds et al. | 707/1 |
| 2003/0229635 A1 * | 12/2003 | Chaudhuri et al. | 707/6 |
| 2004/0204973 A1 | 10/2004 | Witting et al. | |
| 2006/0004654 A1 | 1/2006 | Kornegay et al. | |
| 2006/0010112 A1 | 1/2006 | Crivat et al. | |
| 2006/0218132 A1 * | 9/2006 | Mukhin et al. | 707/4 |
| 2007/0174346 A1 * | 7/2007 | Brown et al. | 707/200 |
| 2007/0239497 A1 * | 10/2007 | Fertig et al. | 705/7 |
| 2008/0189238 A1 * | 8/2008 | Iyer et al. | 707/2 |

OTHER PUBLICATIONS

Paulson. "Building rich web applications with Ajax", Computer, Oct. 2005.*
Brand. "Decision Trees". DBMS Data Mining Solutions Supplement. Feb. 1998.*
Stinson et al. Microsoft® Office Excel 2003. Microsoft Press. Sep. 3, 2003.*

(Continued)

*Primary Examiner*—Donald Sparks
*Assistant Examiner*—David H Kim
(74) *Attorney, Agent, or Firm*—Workman Nydegger

(57) ABSTRACT

Seeking goals in data that can be expressed as rows and columns is provided through predictive analytics. If a desired goal is achievable, the changes to the rows and/or columns that can achieve the goal are presented to a user. If the desired goal is not achievable, an error message or other indicator can be presented to the user. Predictive analytics can include a predictive algorithm, various data mining techniques, or other predictive techniques. A confidence metric of a goal-seek result can be normalized to estimate the degree of confidence that a particular change will yield the desired outcome.

20 Claims, 9 Drawing Sheets

OTHER PUBLICATIONS

Crivat et al. Detect Anomalies in Excel Spreadsheets. Advisor, Oct. 2004.*

Campos et al. Data-Centric Automated Data Mining. ICMLA, Dec. 2005.*

Edwin V. Bonilla, et al. Predictive Search Distributions. http://www.icml2006.org/icml_documents/camera-ready/016_Predictive_Search_Di.pdf. Last accessed Dec. 7, 2006.

Michel Page, et al. An Algorithm for God-Driven Simulation. http://www-lsr.imag.fr/Les.Groupes/sigma/articles/page99b.pdf. Last accessed Dec. 7, 2006.

Marcos M. Campos, et al. Data-Centric Automated Data Mining. http://www.oracle.com/technology/products/bi/odm/pdf/automated_data_mining_paper_1205.pdf. Last accessed Dec. 7, 2006.

* cited by examiner

300 ↘

| | 302 | 304 | 306 |
|---|---|---|---|
| | Number of Children | Age | Marital Status |
| | 0 | 15 | Not Married |
| | 1 | 25 | Not Married |
| | 0 | 35 | Married |
| | 2 | 45 | Married |
| | 1 | 35 | Married |
| 308 | ? | ? | GOAL = Married |

GOAL SEEKING USING PREDICTIVE ANALYTICS

BACKGROUND

Electronic storage mechanisms have enabled accumulation of massive amounts of data. For instance, data that previously required volumes of books for recordation can now be stored electronically without the expense of printing paper and with a fraction of the physical space needed for storage of paper. Many users employ database systems or other systems for storage and organization of data. To maintain data in a readily retrievable format and in an easily understandable manner, the data can be arranged in, or represented by, a tabular format. That is to say, the tabular data can be organized in rows and columns, wherein each row can be regarded as an entity described by properties that are contained in the columns of the row.

In some situations, a user may be interested in performing goal seeks in the tabular data. As such, the user is interested in a particular outcome and would like to know the changes within the data that can bring about that particular outcome. Thus, seeking a goal becomes the problem of finding an optimum input for the function so that the result (e.g., the value of the target column) is as close as possible to the desired target value.

Generally, the implementation of goal seeking is based on cell formulae that requires a target cell to be functionally dependent (through cell formulae) on the input cells. This implementation consists in a search over the set of possible values for the input cells. The search succeeds if one of the inputs yields the desired value for the target cell. Thus, functional dependency (cell formula) between the target column and the remaining cells is needed to perform goal seeking.

SUMMARY

The following presents a simplified summary in order to provide a basic understanding of some aspects of the disclosed embodiments. This summary is not an extensive overview and is intended to neither identify key or critical elements nor delineate the scope of such embodiments. Its purpose is to present some concepts of the described embodiments in a simplified form as a prelude to the more detailed description that is presented later.

In accordance with one or more embodiments and corresponding disclosure thereof, various aspects are described in connection with goal seeking utilizing predictive analytics, data mining models technologies, or other predictive technologies. The goal seeking can be developed based on an existing model that contains patterns that describe the world as viewed through the data. In some embodiments, the goal seeking can be performed by creating a model and using the created model for goal seeking on multiple types of tabular data. In accordance with some embodiments, the confidence of a goal seek result can be normalized to estimate the degree of confidence that the change will yield the desired outcome.

To the accomplishment of the foregoing and related ends, one or more embodiments comprise the features hereinafter fully described and particularly pointed out in the claims. The following description and the annexed drawings set forth in detail certain illustrative aspects and are indicative of but a few of the various ways in which the principles of the embodiments may be employed. Other advantages and novel features will become apparent from the following detailed description when considered in conjunction with the drawings and the disclosed embodiments are intended to include all such aspects and their equivalents.

DETAILED DESCRIPTION

Figure 1:
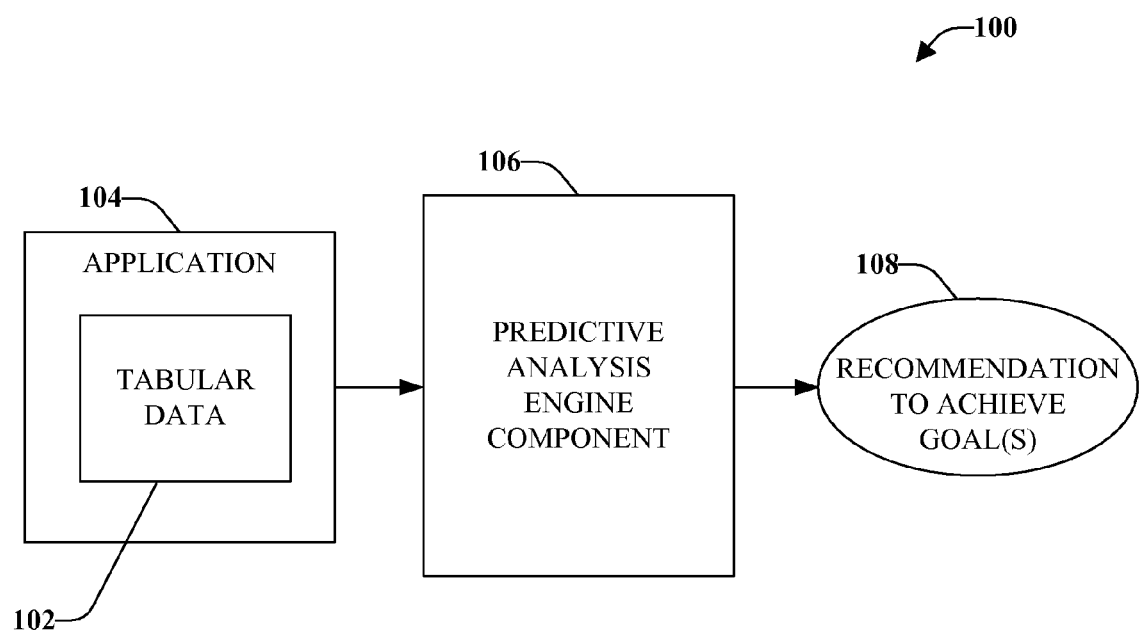
FIG. 1 illustrates a high-level block diagram of a system for goal seeking using predictive analytics.

Various embodiments are now described with reference to the drawings. In the following description, for purposes of explanation, numerous specific details are set forth in order to provide a thorough understanding of one or more aspects. It may be evident, however, that the various embodiments may be practiced without these specific details. In other instances, well-known structures and devices are shown in block diagram form in order to facilitate describing these embodiments.

As used in this application, the terms "component", "module", "system", and the like are intended to refer to a computer-related entity, either hardware, a combination of hardware and software, software, or software in execution. For example, a component may be, but is not limited to being, a process running on a processor, a processor, an object, an executable, a thread of execution, a program, and/or a computer. By way of illustration, both an application running on a server and the server can be a component. One or more components may reside within a process and/or thread of execution and a component may be localized on one computer and/or distributed between two or more computers.

The word "exemplary" is used herein to mean serving as an example, instance, or illustration. Any aspect or design described herein as "exemplary" is not necessarily to be construed as preferred or advantageous over other aspects or designs.

Furthermore, the one or more embodiments may be implemented as a method, apparatus, or article of manufacture using standard programming and/or engineering techniques to produce software, firmware, hardware, or any combination thereof to control a computer to implement the disclosed embodiments. The term "article of manufacture" (or alternatively, "computer program product") as used herein is intended to encompass a computer program accessible from any computer-readable device, carrier, or media. For example, computer readable media can include but are not limited to magnetic storage devices (e.g., hard disk, floppy disk, magnetic strips . . . ), optical disks (e.g., compact disk (CD), digital versatile disk (DVD) . . . ), smart cards, and flash memory devices (e.g., card, stick). Additionally it should be appreciated that a carrier wave can be employed to carry computer-readable electronic data such as those used in transmitting and receiving electronic mail or in accessing a network such as the Internet or a local area network (LAN). Of course, those skilled in the art will recognize many modifications may be made to this configuration without departing from the scope of the disclosed embodiments.

Various embodiments will be presented in terms of systems that may include a number of components, modules, and the like. It is to be understood and appreciated that the various systems may include additional components, modules, etc. and/or may not include all of the components, modules, etc. discussed in connection with the figures. A combination of these approaches may also be used. The various embodiments disclosed herein can be performed on electrical devices including devices that utilize touch screen display technologies and/or mouse-and-keyboard type interfaces. Examples of such devices include computers (desktop and mobile), smart phones, personal digital assistants (PDAs), and other electronic devices both wired and wireless.

Referring initially to FIG. 1, illustrated is a high-level block diagram of a system 100 for goal seeking using predictive analytics. System 100 can be configured to evaluate tabular data and perform goals seeks on that tabular data, which can be requested by a user. The term goal, for a given row, is used herein as a maximized likelihood that a certain column (e.g., target column) has a certain value (e.g., target value). A goal is typically an optimization for a certain business problem applied to the respective row.

An example of such a goal can be in the context of a column labeled "Housing: Own or Rent". The rows corresponding to that column can take the values "Own" and "Rent". For this example, the goal is the "Own" state. The semantics can be that a certain business problem is optimized if the person identified by that row/column pair owns a house. Another example is a column labeled "Income", which may take any numeric value between 0 and 100,000. A goal can be a value of "95,000." This indicates that a certain business problem can be optimized if the income of the entity defined by that row/column pair is as close as possible to 95,000.

In further detail, system 100 includes tabular data 102, which can be any form of tabular data 102 contained in an application 104. The tabular data 102 can be in various forms, such as in a server in a relational form, in a storage media on a client application, or in numerous other forms. The tabular data 102 can be in a variety of formats, such as a spreadsheet, extensible markup language XML data that can be represented as tabular data, a grid based application, a form, a report, a webpage, a printout, or other data that can be divided into fields. Thus, tabular data, as used herein, can be any data that is user visible and/or user interactive.

The tabular data information 102 can be provided to a predictive analysis engine component 106 that can be configured to analyze the tabular data 102 and determine a change or changes to an input (e.g., row/column pair) that can result in a desired output or goal(s) 108. The recommended change(s) to achieve the goal(s) 108 can be presented to a user for further action. If the analysis by predictive analysis engine component 106 indicates that changes will not result in the goal, the recommendation 108 can instead be an error message that can be presented to the user. This error message can be presented in various formats (e.g., text message, audio message, other visual or audible indications), provided it is understandable to the user.

The tabular data 102 and/or application 104 can be located remote from the predictive analysis engine component 106. That is to say, the disclosed computations, modeling and predictive analytics can be executed on a server independent of the location of the data. For example, the data 102 can be retained in a client machine and the predictive analysis engine component 106 and/or other system 100 components can be located on another machine, such as a remote server. Therefore, a device with low computing power can interact with a server machine, which can perform the computational complexities described herein. The interaction can be through various connections, both wired and wireless.

Figure 2:
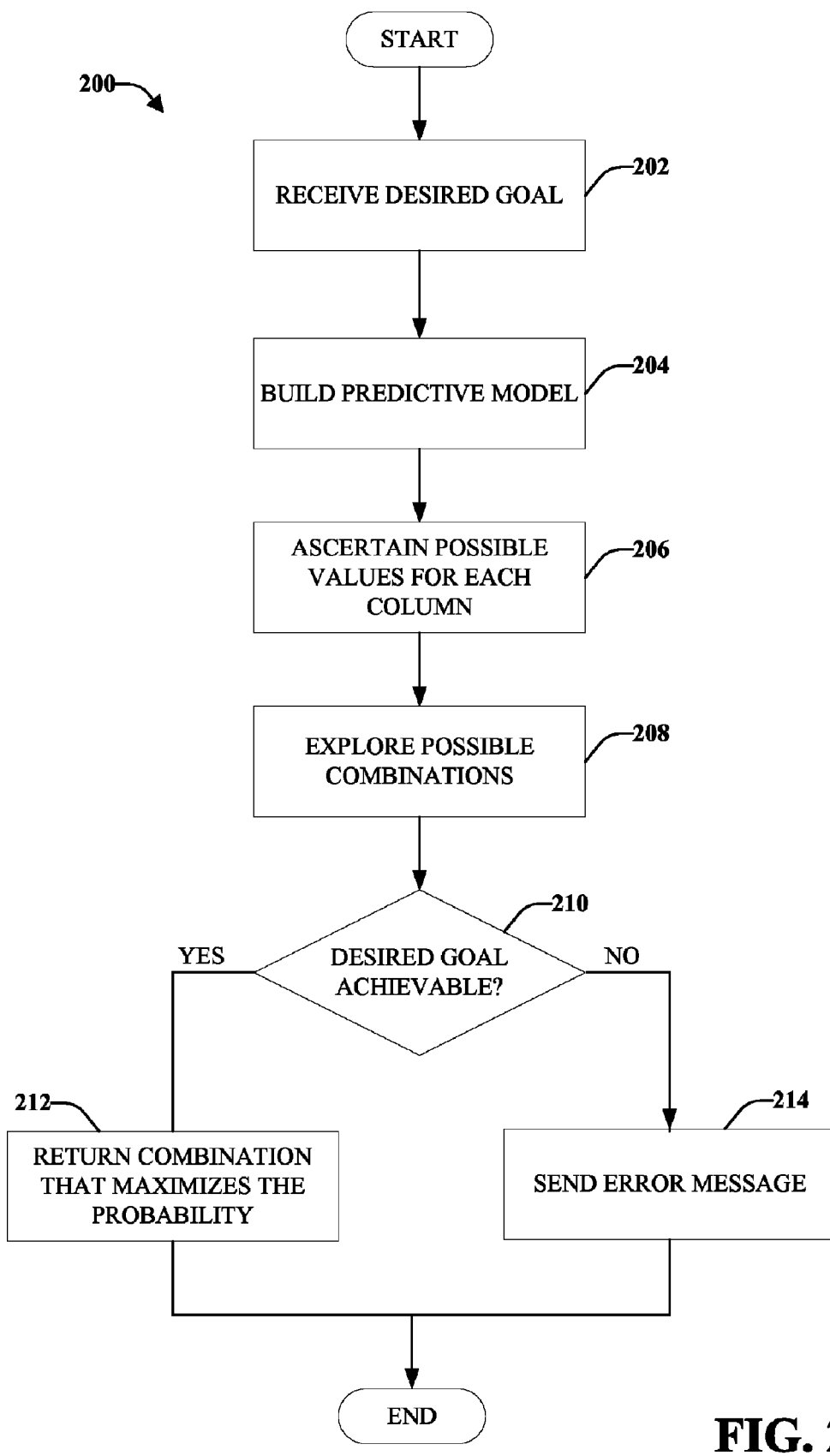
FIG. 2 illustrates a methodology for dynamic goal seeking in tabular data.

FIG. 2 illustrates a methodology 200 for dynamic goal seeking in tabular data. While, for purposes of simplicity of explanation, the methodologies are shown and described as a series of blocks, it is to be understood and appreciated that the disclosed embodiments are not limited by the number or order of blocks, as some blocks may occur in different orders and/or concurrently with other blocks from what is depicted and described herein. Moreover, not all illustrated blocks may be required to implement the methodologies described hereinafter. It is to be appreciated that the functionality associated with the blocks may be implemented by software, hardware, a combination thereof or any other suitable means (e.g. device, system, process, component). Additionally, it should be further appreciated that the methodologies disclosed hereinafter and throughout this specification are capable of being stored on an article of manufacture to facilitate transporting and transferring such methodologies to various devices. Those skilled in the art will understand and appreciate that a methodology could alternatively be represented as a series of interrelated states or events, such as in a state diagram.

The disclosed embodiments do not have to rely on functional dependency for goal seeking but instead can infer the functional dependency based on the rows other than the row being analyzed in the tabular data. These other rows should be semantically related to the row and goal being analyzed. The goal seeking can be performed for both categorical data and continuous data. The results of applying a function to the possible n-tuples $(A_1, A_2, A_3, \ldots A_n)$ can be evaluated and the result that generates the closest output to the goal can be chosen. A tuple, as used herein, is one row of the tabular data (or data that can be expressed as a row if the data is not in tabular format). The methodology 200 can be independent of the predictive solution being utilized (e.g., any predictive analytics can be used including data mining and other analytic techniques) and/or the number of columns being considered as inputs for seeking the goal.

Method 200, can start, at 202, when a desired goal is received from a user and/or entity (e.g., the Internet, another system, a computer, . . . ), referred to herein as user. Based on the desired goal, a predictive model can be built from the tabular data, at 204. The predictive model can be a classification model (e.g., for a categorical goal), a estimation model (e.g., for a continuous goal), or another type of model. The model can determine patterns that can determine a value or values of a target column as a function of the other columns within the tabular data that can result in the desired goal. A function that can be utilized to describe the target column values can be:

$$F=(Col1\text{Values} \times Col2\text{Values} \times \ldots \times ColN\text{ values}) \rightarrow (\text{targetColValues})$$

where N is an integer greater than or equal to one. An input argument for the above function can be an n-tuple: $(A_1, A_2, A_3, \ldots A_n)$ where $A_i$ is one of the possible values of the $i^{th}$ column.

At 206, the set of possible values for each column in the tabular data can be ascertained, which can occur at substantially the same time as the modeling, at 204. For a current row, the possible combinations of states for the input columns can be explored, at 208, and a determination whether one or more of the combinations of states might achieve the desired goal can be made, at 210. If the desired goal can be achieved ("YES"), the combination of states that maximizes the probability that the target column has the desired value is output, at 212. This output value can be presented to the user for further action. In some situations, it is possible that none of the evaluated combinations of values will achieve the desired goal ("NO"). In this case, an error is reported, at 214. The error can be a message to the user indicating that the goal is not achievable, this error message can take various forms and can be presented in various different ways (e.g., text message, voice message, or other visual or audible means).

Figures 3, 4:
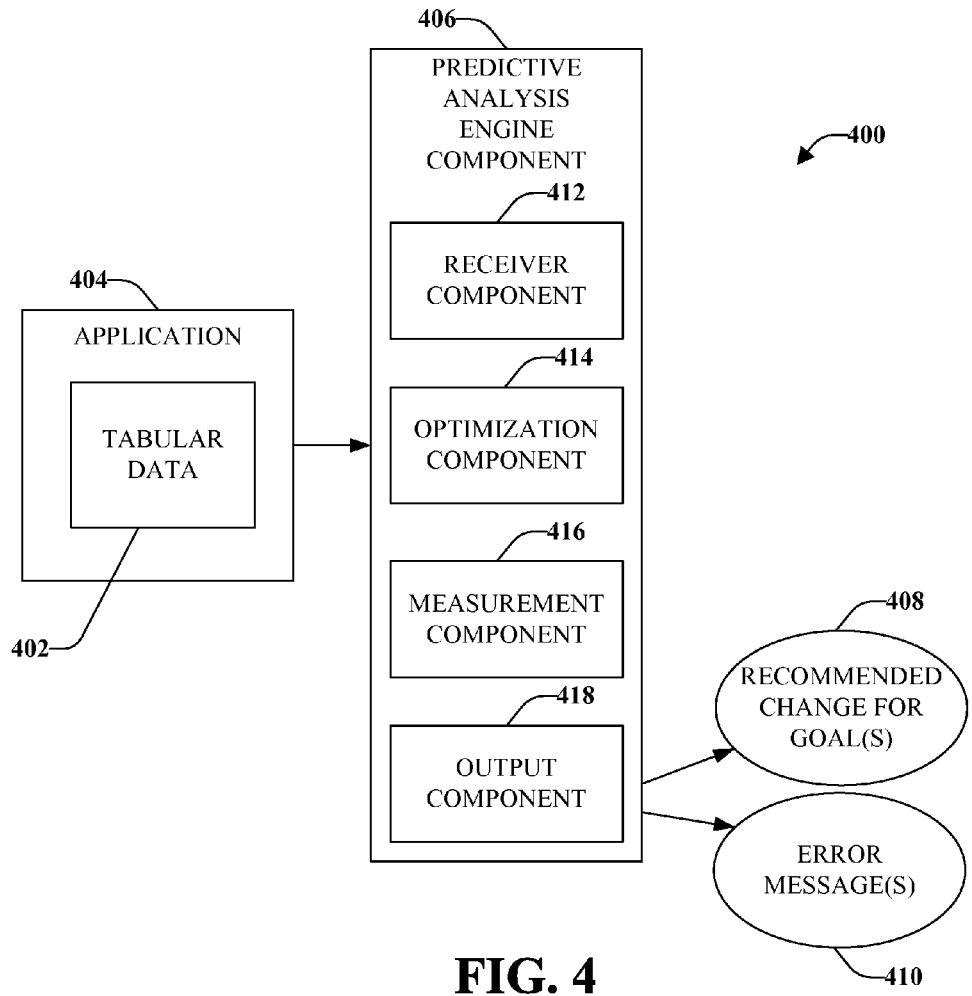
FIG. 3 illustrates exemplary tabular data to which the one or more of the disclosed embodiments can be applied.
FIG. 4 illustrates a system for seeking goals by determining one or more inputs that can maximize the likelihood of reaching a desired goal.

With reference now to FIG. 3, illustrated is exemplary tabular data 300 to which the one or more disclosed embodiments can be applied. The exemplary tabular data 300 illustrated and described includes three columns, "Number of Children" 302, "Age" 304 and "Marital Status" 306 and six rows within those columns. For this example, the goal is to obtain the "Married" state in the "Marital Status" 306 column for the $6^{th}$ row, illustrated at 308.

First, a predictive model is built and patterns determined. Depending on the predictive analytics (e.g., predictive algorithm, data mining models technology, data mining methodologies and so forth) various patterns can be obtained. Such patterns can include the following:

"If Age is 15 or 25, then Not Married, else if Age is 35 or 45 then Married", with a certainty of 100%
OR
"If Age is less than 30, then Not Married, else Married", with a certainty of 100%
OR
"If age is greater than 30 and Number of Children is more than 0, then Married", with a certainty of 66%.

For this example, the first pattern ("If Age is 15 or 25, then Not Married, else if Age is 35 or 45 then Married", with a certainty of 100%) is obtained. Further information relating to the certainty percentages will be provided below.

Based on the determined pattern, the possible values for each column can be obtained. These possible values represent all the values within each column that are possible, based on the world as viewed by the data. Thus, if a column does not contain a particular value it is not considered. For example, values that would not be considered for the "Marital Status" column include "Divorced", "Single", "Widowed" and so forth because the world, as viewed by the data, only contains the fields "Married" and "Not Married". The possible values for the exemplary table 300 illustrated are:

Number of Children: 0, 1, 2
Age: 15, 25, 35, 45
Marital Status: Not Married, Married Next, the possible combinations can be explored and the combination that maximizes the probability (e.g., the desired goal) is returned or output to the user. Based on the simple patterns described above, the probability for "Married", which is the desired goal, can be maximized if "Age" is 35 or 45. Thus, the output presented to the user can suggest changing the Age column to 35 or 45. However, as will be discussed further below, there may be situations for which a subset (or none) of the columns are candidates for change and thus, the desired goal cannot be achieve based on the current information.

With reference now to FIG. 4, illustrated is a system 400 for seeking goals by determining one or more inputs that can maximize the likelihood of reaching a desired goal. System includes tabular data 402 (or data that can be expressed as tabular data) within an application 404. A predictive analysis engine component 406 can receive information related to a desired goal and analyze the tabular data 402 to recommend one or more actions that might be taken to achieve the goal 408. If predictive analysis engine component 406 determines that a goal is not achievable, an error message 410 can be presented to a user. The user can redefine the goal or take other action as appropriate.

In further detail, predictive analysis engine component 406 can include a receiver component 412 that can be configured to receive a user defined goal, which can be an optimization for a business problem applied to a respective row. Receiver component 412 can also be configured to receive or request tabular data 402 that corresponds to the goal.

Also included is an optimization component 414 that can be configured to optimize goal seeking in the case of a single degree of freedom. That is to say an implementation can be: for a given row, find the value of column Source that can maximize the likelihood of reaching the goal in the Target column. In some scenarios, it is likely that only some of the input columns are candidates for change in order to achieve a goal (e.g., the problem may have a relatively small number of degrees of freedom). This can be caused by the fact that certain attributes of the entities modeled by rows cannot be reasonably changed. For example, in a direct marketing scenario, one might choose between offering a customer a free gadget or a free trip, but cannot change the customer's address.

Figure 5:
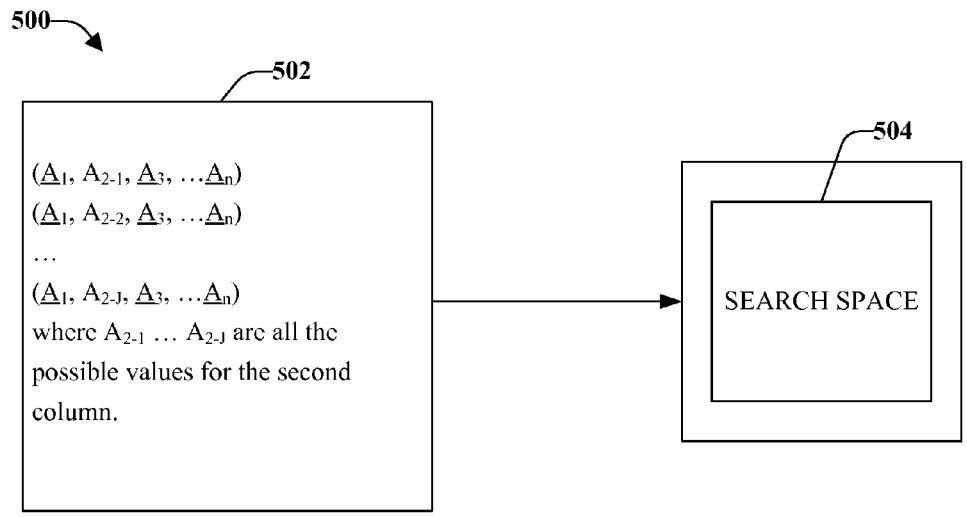
FIG. 5 illustrates an exemplary search space generated based on a categorical input column.

For situations where some or most of the n-tuple's elements are fixed, optimization component 414 can be configured to evaluate the function:

$$F=(Col1\text{Values} \times Col2\text{Values} \times \ldots \times ColN\text{ values})\,(\text{targetColValues})$$

for n-tuples with some fixed positions. With reference now to FIG. 5, illustrated is an exemplary search space generated based on a categorical input column. As illustrated an input value 502 that contains a finite set of categorical values or labels. As illustrated, $(\underline{A}_1, A_2, \underline{A}_3, \ldots \underline{A}_n)$ is a row where $\underline{A}_1$, $\underline{A}_3$ and $\underline{A}_n$ represent fixed positions. Each distinct value of the input column can create a possible n-tuple together with the columns that should not change. This is represented as the search space 504 that contains all possible n-tuples. Therefore, the search space 504 is reduced to the values of $A_2$ and the function is evaluated (by optimization component 414) for:

$(\underline{A}_1, A_{2\text{-}1}, \underline{A}_3, \ldots \underline{A}_n)$
$(\underline{A}_1, A_{2\text{-}2}, \underline{A}_3, \ldots \underline{A}_n)$
$(\underline{A}_1, A_{2\text{-}J}, \underline{A}_3, \ldots \underline{A}_n)$ where $A_{2\text{-}1} \ldots A_{2\text{-}J}$ are all the possible values for the second column.

The following is a practical example to illustrate the above. The goal of this example is to find the saving offer that can maximize the likelihood that a particular customer will buy a bike. This particular customer has the following attributes:

Age=25; Distance from Work=2-5 miles; Number of Cars=0; Savings Offer=?. Optimization component 414 can determine those factors that should not be optimized (because they are fixed). In this example, these factors are Age, Distance from Work and Number of Cars, which are not in control of the salesperson trying to sell the bike. Information relating to generating a search space on a continuous input column will be provided below with reference to FIG. 8.

Additionally or alternatively, optimization component 414 can be configured to support multiple degrees of freedom. As such, optimization component 414 can generate correct results utilizing a greedy approach, which generally involves making the decision that seems the best at the moment the decision is made without reconsidering this decision, regardless of later situations. The greedy approach utilized by optimization component 414 can include solving the problem, as indicated above, for each individual input column. Then one n-tuple can be created that contains the best results for each input column. The created n-tuple can be suggested as a result of the goal-seek operation. Additionally or alternatively, the solution can be optimized to remove local optimums by taking into account the first N best solutions for each column and testing the combination of these top N partial solutions.

Predictive analysis engine component 406 can also include a measurement component 416 that can determine a measure or degree of confidence that a recommended change will yield the desired outcome or goal. This measurement and/or the degree of confidence can be presented to the user through a display or output component 418. In addition, output component 418 can present the results from optimization component 414 or other system 400 components.

Measurement component 416 can be configured to measure the degree of confidence directly from the predictive model generated by optimization component 414. When traversing the input space, measurement component 416 can obtain a certain confidence (e.g., probability) that the goal can be reached for each n-tuple. The suggestion can then be the n-tuple with the maximum probability.

By way of example and not limitation, a target column has exactly 2 states, which are "Yes" and "No". The goal for this example is "Yes" and measurement component 416 determines that changing an input column to value "A" yields a goal confidence of 90%. Measurement component 416 further determines that changing an input column to value "B" yields a goal confidence of 20%. Both these confidence levels can be presented to the user. In this case, the raw confidence is convincing since 90% is much better than 20%. However, the result would not be convincing if the confidence is actually 51%. Similarly, a probability of 10% is not convincing, but may indicate a lot if the target column has one hundred distinct states.

To measure confidence, measurement component 416 can use a normalization process which can take into account the confidence returned by the best input n-tuple and/or the prior probability that the target is already the goal. Continuing the above example, if at training time, measurement component 416 determines that the probability of "Yes" is 10% and the probability of "No" is 90%. After a goal seek procedure is performed, it is determined that the best n-tuple has a probability of 80% of reaching the goal. This 80% can represent a significant lift over the original 10%. Therefore, this result can be suggested by measurement component 416 with a high confidence. However, if the probability of "Yes" is 90% and the best n-tuple has a probability of 91% of reaching the goal, this 91% is not a significant lift over 90%. Therefore, this result has a limited confidence.

Measurement component 416 can also utilize a normalization mechanism, which is an exponential function applied to the probability lift. The probability lift can be defined as:

Lift=(([Best N-tuple probability]−[Prior probability of the Goal])/[Prior probability of the Goal])

The normalized confidence can be computed as:

Confidence=100.0*exp(Lift)/(1+exp(Lift))

where the exponential function has values in the 0-1 space and multiplication by 100 normalizes the confidence between 0 and 100.0.

Figure 6:
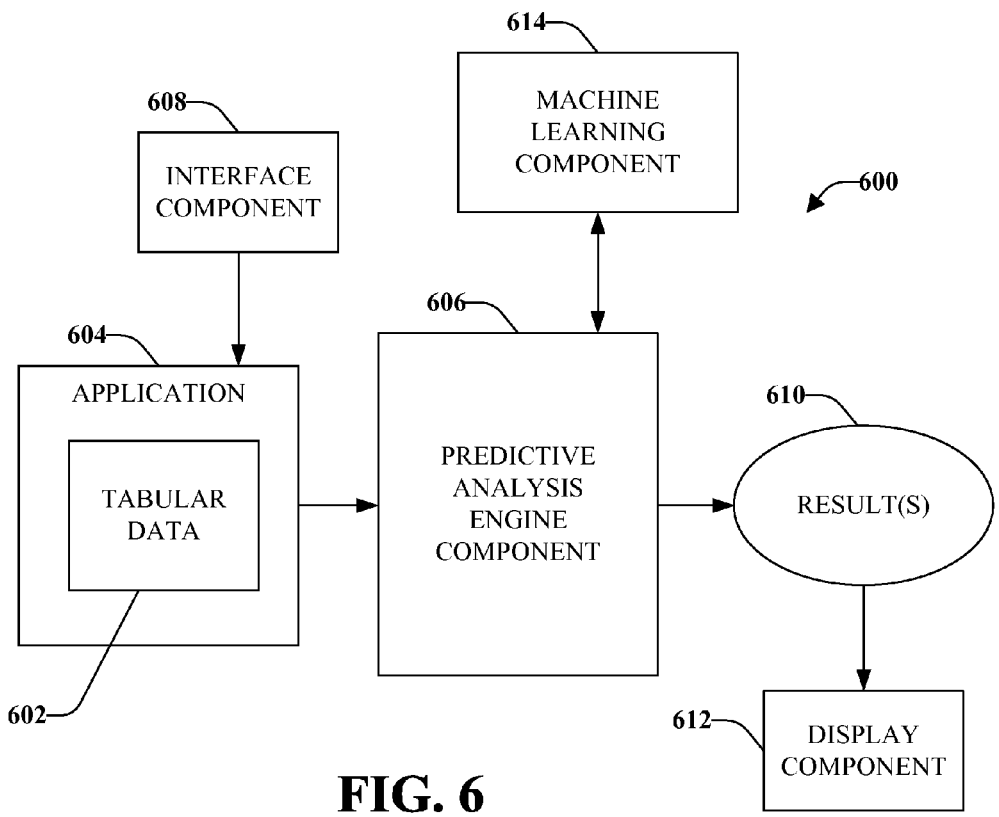
FIG. 6 illustrates a block diagram of a system for categorical and continuous goal seeks.

With reference now to FIG. 6, illustrated is a block diagram of a system 600 for categorical and continuous goal seeks. In some embodiments, a user can interface with the tabular data 602, the application 604 and/or the predictive analysis engine component 606 through, for example, an interface component 608. The interface component 608 can be, but is not limited to being, a keyboard, a mouse, a pressure-sensitive screen, a graphical user interface, a microphone, and voice recognition software. The results 610 of the predictive analysis engine component 606 can be presented to the user through a display component 612 such as a graphical user interface. In accordance with some embodiments, the data 602, interface component 608 and/or display component 612 are located remote from the other system 600 components and accessed through various means (e.g., Internet portal, and so forth).

In some embodiments, a machine learning component 614 can be utilized with the disclosed techniques. The machine-learning component 614 can employ artificial intelligence based systems (e.g., explicitly and/or implicitly trained classifiers) in connection with performing inference and/or probabilistic determinations and/or statistical-based determinations with respect to goal seeking and which columns/rows and changes within those columns/rows might bring about the desired goal(s).

As used herein, the term "inference" refers generally to the process of reasoning about or inferring states of the system, environment, and/or user from a set of observations as captured through events and/or data. Inference can be employed to identify a specific context or action, or can generate a probability distribution over states, for example. The inference can be probabilistic—that is, the computation of a probability distribution over states of interest based on a consideration of data and events. Inference can also refer to techniques employed for composing higher-level events from a set of events and/or data. Such inference results in the construction of new events or actions from a set of observed events and/or stored event data, whether or not the events are correlated in close temporal proximity, and whether the events and data come from one or several event and data sources. Various classification schemes and/or systems (e.g., support vector machines, neural networks, expert systems, Bayesian belief networks, fuzzy logic, data fusion engines, and so forth) can be employed in connection with performing automatic and/or inferred action in connection with the disclosed techniques.

Figure 7:
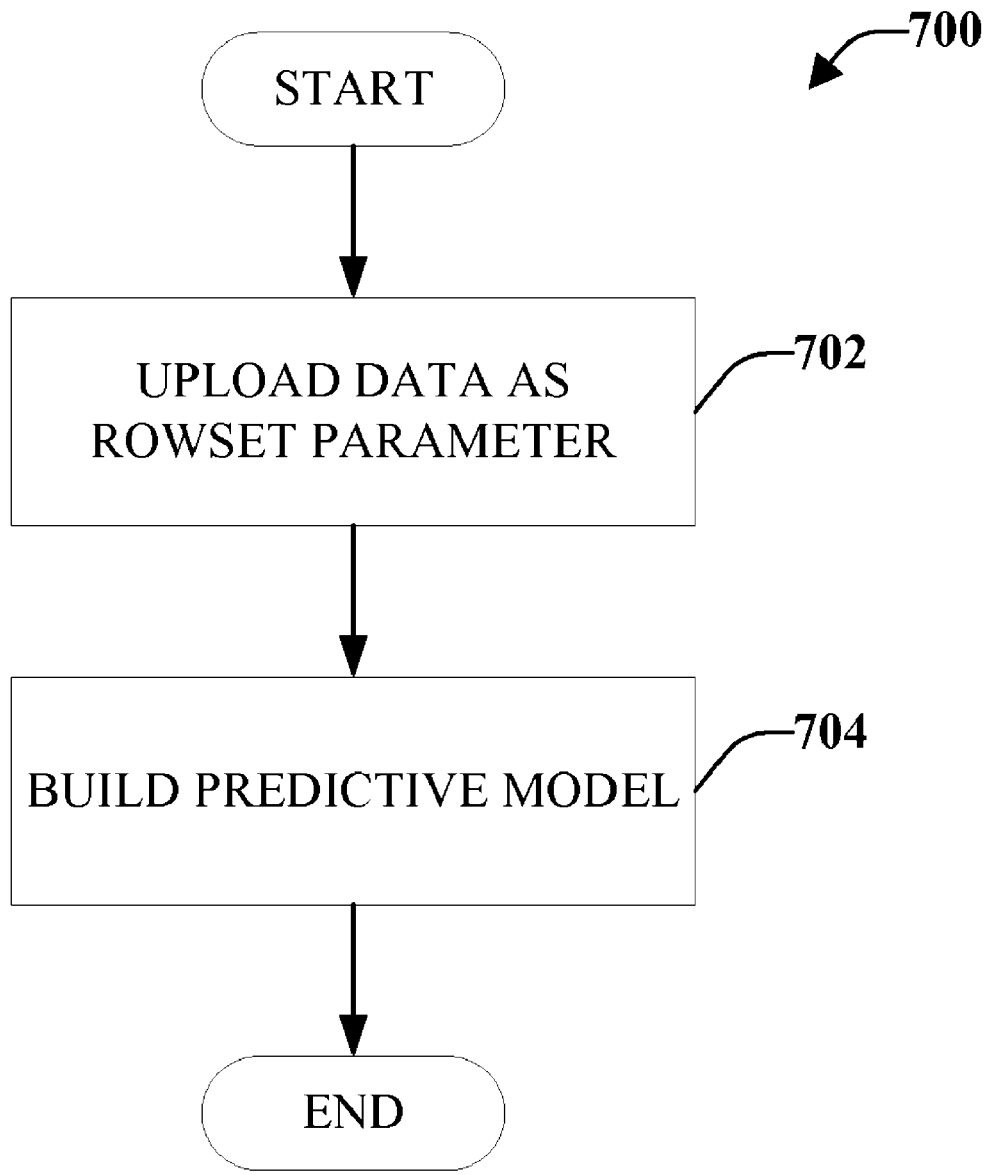
FIG. 7 illustrates a methodology for building a predictive model in accordance with the various embodiments disclosed herein.

FIG. 7 illustrates a methodology 700 for building a predictive model in accordance with the various embodiments disclosed herein. The methodology can apply to nominal and/or numeric columns. At 702, tabular data is uploaded as a rowset parameter. The rowset parameter can be utilized to build a predictive model, at 704. The predictive model can be for classification and/or regression and, therefore, can apply to nominal and/or numeric columns. A variety of predictive analytics, data mining models technologies, data mining methodologies, and so forth can be utilized to build the predictive model. Training data can be utilized to build a model that learns patterns of the data. Various algorithms, methods, and/or techniques can be employed to build the predictive model and all such algorithms, methods, and/or techniques are intended to fall within the scope of this detailed description.

Figure 8:
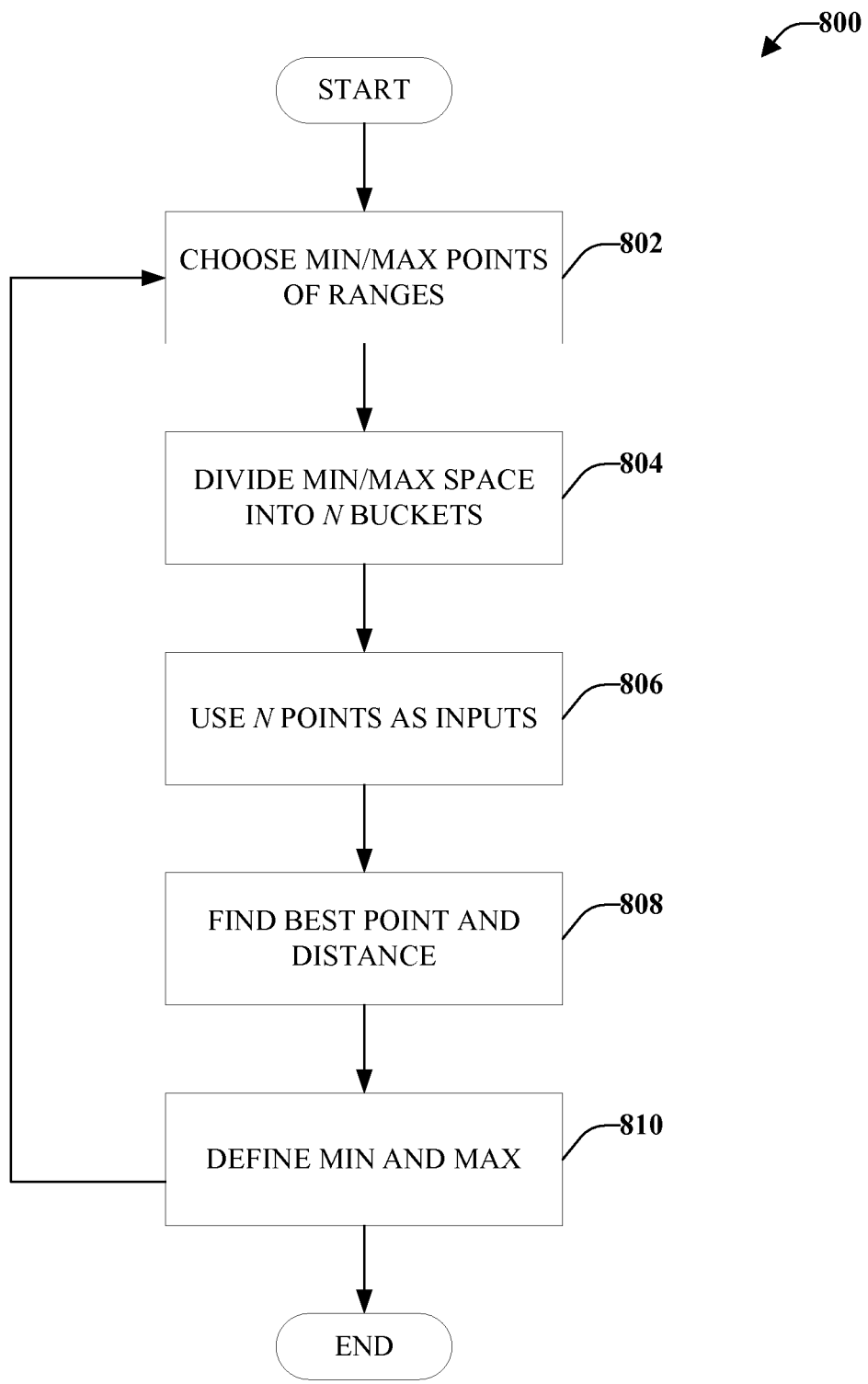
FIG. 8 illustrates a methodology for generating a search space based on a continuous input column.

FIG. 8 illustrates a methodology 800 for generating a search space based on a continuous input column. The input column can take any value in a range of the numeric/date time space. The search space can contain all the distinct values and can be computed iteratively. At 802, minimum/maximum (min/max) points of the range of possible values for the input can be chosen. The min/max space in N buckets are divided into a similar size ($\delta$=(max−min)/N), at 804. These N points or bucket limits are used as inputs, at 806.

At 808, the best point and the distance between the goal and the best point's solution are found. The min and max are defined, at 810, where min is defined as ([best point]−$\delta$) and max is defined as ([best point]+$\delta$). Method 800 can continue, at 802, where a min/max point of range of possible values for the input are chosen. This can be repeated until the distance becomes stable (e.g., for about five iterations).

Figure 9:
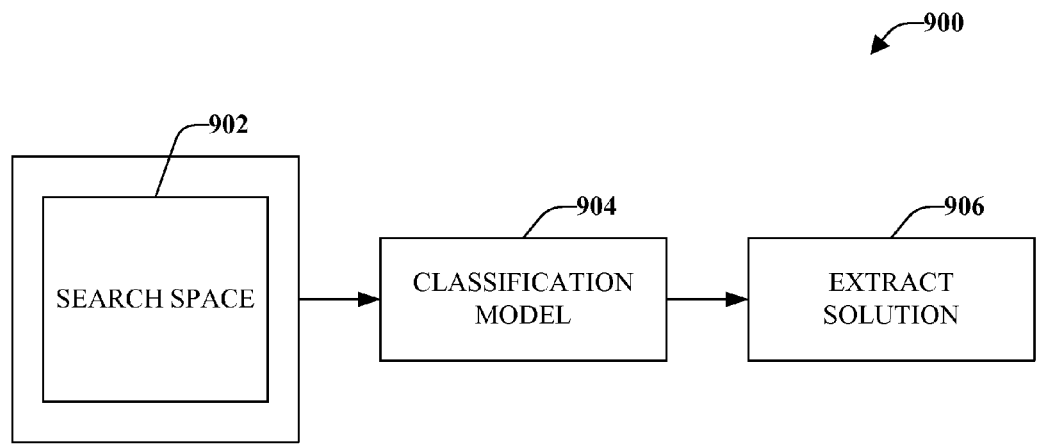
FIG. 9 illustrates seeking a categorical goal in accordance with the disclosed embodiments.

FIG. 9 illustrates seeking a categorical goal 900 in accordance with the disclosed embodiments. A categorical goal 900 can be a target column that contains a finite set of categorical values or labels. A search space 902 can contain all possible n-tuples. This search space can be evaluated through a classification model 904. The possible solution can be evaluated or the solution extracted 906 based on the probability it yields for the goal value.

Figure 10:
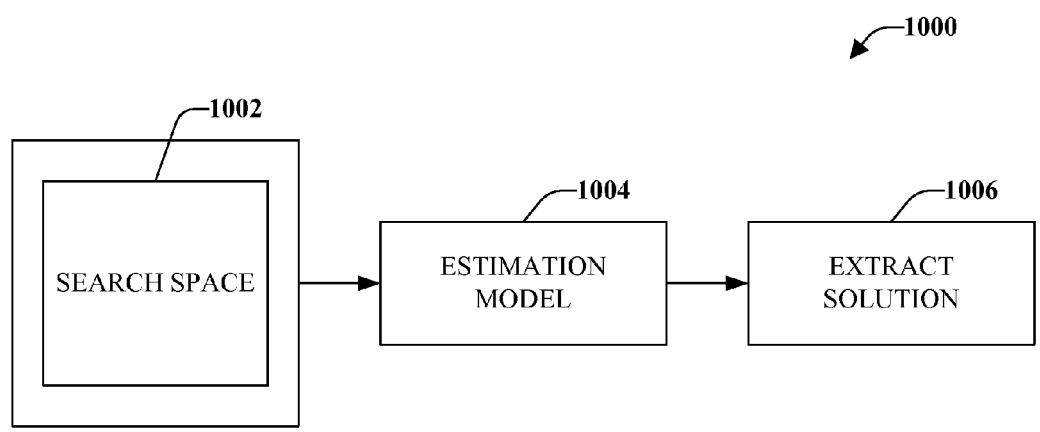
FIG. 10 illustrates seeking a continuous goal in accordance with the various embodiments presented herein.

FIG. 10 illustrates seeking a continuous goal 1000 in accordance with the various embodiments presented herein. The continuous goal 1000 is the target column that contains values in a range or interval, such as numbers of dates, for example. A search space 1000 can contain all possible n-tuples. This search space 1002 can be evaluated through an estimation model 1004. A solution can be extracted 1006 that generates the closest estimation (e.g., absolute value) to the goal.

Figure 11:
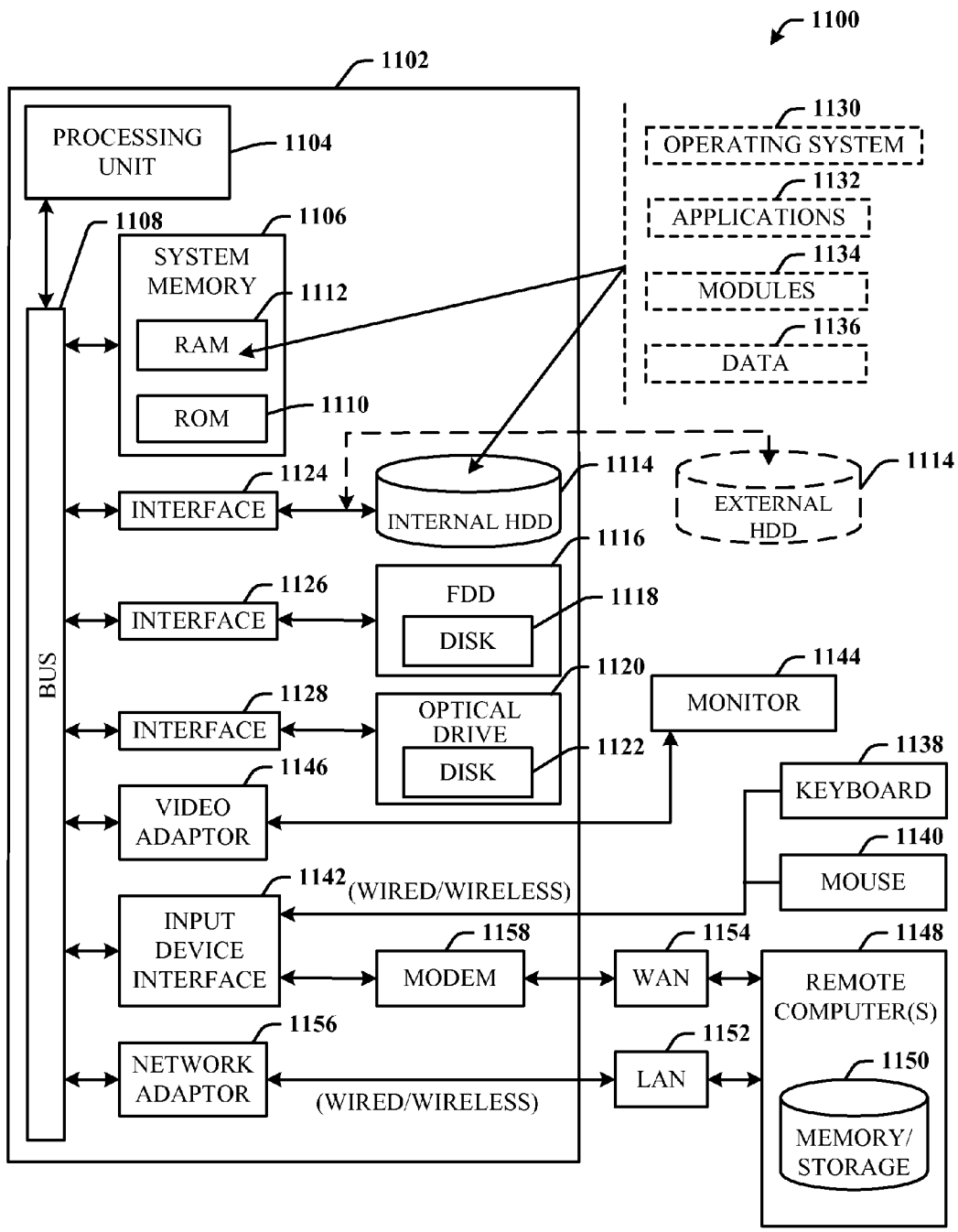
FIG. 11 illustrates a block diagram of a computer operable to execute the disclosed embodiments.

Referring now to FIG. 11, there is illustrated a block diagram of a computer operable to execute the disclosed architecture. In order to provide additional context for various aspects disclosed herein, FIG. 11 and the following discussion are intended to provide a brief, general description of a suitable computing environment 1100 in which the various aspects can be implemented. While the one or more embodiments have been described above in the general context of computer-executable instructions that may run on one or more computers, those skilled in the art will recognize that the various embodiments also can be implemented in combination with other program modules and/or as a combination of hardware and software.

Generally, program modules include routines, programs, components, data structures, etc., that perform particular tasks or implement particular abstract data types. Moreover, those skilled in the art will appreciate that the inventive methods can be practiced with other computer system configurations, including single-processor or multiprocessor computer systems, minicomputers, mainframe computers, as well as personal computers, hand-held computing devices, microprocessor-based or programmable consumer electronics, and the like, each of which can be operatively coupled to one or more associated devices.

The illustrated aspects may also be practiced in distributed computing environments where certain tasks are performed by remote processing devices that are linked through a communications network. In a distributed computing environment, program modules can be located in both local and remote memory storage devices.

A computer typically includes a variety of computer-readable media. Computer-readable media can be any available media that can be accessed by the computer and includes both volatile and nonvolatile media, removable and non-removable media. By way of example, and not limitation, computer-readable media can comprise computer storage media and communication media. Computer storage media includes both volatile and nonvolatile, removable and non-removable media implemented in any method or technology for storage of information such as computer-readable instructions, data structures, program modules or other data. Computer storage media includes, but is not limited to, RAM, ROM, EEPROM, flash memory or other memory technology, CD-ROM, digital video disk (DVD) or other optical disk storage, magnetic cassettes, magnetic tape, magnetic disk storage or other magnetic storage devices, or any other medium which can be used to store the desired information and which can be accessed by the computer.

Communication media typically embodies computer-readable instructions, data structures, program modules or other data in a modulated data signal such as a carrier wave or other transport mechanism, and includes any information delivery media. The term "modulated data signal" means a signal that has one or more of its characteristics set or changed in such a manner as to encode information in the signal. By way of example, and not limitation, communication media includes wired media such as a wired network or direct-wired connection, and wireless media such as acoustic, RF, infrared and other wireless media. Combinations of the any of the above should also be included within the scope of computer-readable media.

With reference again to FIG. 11, the exemplary environment 1100 for implementing various aspects includes a computer 1102, the computer 1102 including a processing unit 1104, a system memory 1106 and a system bus 1108. The system bus 1108 couples system components including, but not limited to, the system memory 1106 to the processing unit 1104. The processing unit 1104 can be any of various commercially available processors. Dual microprocessors and other multi-processor architectures may also be employed as the processing unit 11104.

The system bus 1108 can be any of several types of bus structure that may further interconnect to a memory bus (with or without a memory controller), a peripheral bus, and a local bus using any of a variety of commercially available bus architectures. The system memory 1106 includes read-only memory (ROM) 1110 and random access memory (RAM) 1112. A basic input/output system (BIOS) is stored in a nonvolatile memory 1110 such as ROM, EPROM, EEPROM, which BIOS contains the basic routines that help to transfer information between elements within the computer 1102, such as during start-up. The RAM 1112 can also include a high-speed RAM such as static RAM for caching data.

The computer 1102 further includes an internal hard disk drive (HDD) 1114 (e.g., EIDE, SATA), which internal hard disk drive 1114 may also be configured for external use in a suitable chassis (not shown), a magnetic floppy disk drive (FDD) 1116, (e.g., to read from or write to a removable diskette 1118) and an optical disk drive 1120, (e.g., reading a CD-ROM disk 1122 or, to read from or write to other high capacity optical media such as the DVD). The hard disk drive 1114, magnetic disk drive 1116 and optical disk drive 1120 can be connected to the system bus 1108 by a hard disk drive interface 1124, a magnetic disk drive interface 1126 and an optical drive interface 1128, respectively. The interface 1124 for external drive implementations includes at least one or both of Universal Serial Bus (USB) and IEEE 1394 interface technologies. Other external drive connection technologies are within contemplation of the one or more embodiments.

The drives and their associated computer-readable media provide nonvolatile storage of data, data structures, computer-executable instructions, and so forth. For the computer 1102, the drives and media accommodate the storage of any data in a suitable digital format. Although the description of computer-readable media above refers to a HDD, a removable magnetic diskette, and a removable optical media such as a CD or DVD, it should be appreciated by those skilled in the art that other types of media which are readable by a computer, such as zip drives, magnetic cassettes, flash memory cards, cartridges, and the like, may also be used in the exemplary operating environment, and further, that any such media may contain computer-executable instructions for performing the methods disclosed herein.

A number of program modules can be stored in the drives and RAM 1112, including an operating system 1130, one or more application programs 1132, other program modules 1134 and program data 1136. All or portions of the operating system, applications, modules, and/or data can also be cached in the RAM 1112. It is appreciated that the various embodiments can be implemented with various commercially available operating systems or combinations of operating systems.

A user can enter commands and information into the computer 1102 through one or more wired/wireless input devices, e.g., a keyboard 1138 and a pointing device, such as a mouse 1140. Other input devices (not shown) may include a microphone, an IR remote control, a joystick, a game pad, a stylus pen, touch screen, or the like. These and other input devices are often connected to the processing unit 1104 through an input device interface 1142 that is coupled to the system bus 1108, but can be connected by other interfaces, such as a parallel port, an IEEE 1394 serial port, a game port, a USB port, an IR interface, etc.

A monitor 1144 or other type of display device is also connected to the system bus 1108 through an interface, such as a video adapter 1146. In addition to the monitor 1144, a computer typically includes other peripheral output devices (not shown), such as speakers, printers, etc.

The computer 1102 may operate in a networked environment using logical connections through wired and/or wireless communications to one or more remote computers, such as a remote computer(s) 1148. The remote computer(s) 1148 can be a workstation, a server computer, a router, a personal computer, portable computer, microprocessor-based entertainment appliance, a peer device or other common network node, and typically includes many or all of the elements described relative to the computer 1102, although, for purposes of brevity, only a memory/storage device 1150 is illustrated. The logical connections depicted include wired/wireless connectivity to a local area network (LAN) 1152 and/or larger networks, e.g., a wide area network (WAN) 1154. Such LAN and WAN networking environments are commonplace in offices and companies, and facilitate enterprise-wide computer networks, such as intranets, all of which may connect to a global communications network, e.g., the Internet.

When used in a LAN networking environment, the computer 1102 is connected to the local network 1152 through a wired and/or wireless communication network interface or adapter 1156. The adaptor 1156 may facilitate wired or wireless communication to the LAN 1152, which may also include a wireless access point disposed thereon for communicating with the wireless adaptor 1156.

When used in a WAN networking environment, the computer 1102 can include a modem 1158, or is connected to a communications server on the WAN 1154, or has other means for establishing communications over the WAN 1154, such as by way of the Internet. The modem 1158, which can be internal or external and a wired or wireless device, is connected to the system bus 1108 through the serial port interface 1142. In a networked environment, program modules depicted relative to the computer 1102, or portions thereof, can be stored in the remote memory/storage device 1150. It will be appreciated that the network connections shown are exemplary and other means of establishing a communications link between the computers can be used.

The computer 1102 is operable to communicate with any wireless devices or entities operatively disposed in wireless communication, e.g., a printer, scanner, desktop and/or portable computer, portable data assistant, communications satellite, any piece of equipment or location associated with a wirelessly detectable tag (e.g., a kiosk, news stand, restroom), and telephone. This includes at least Wi-Fi and Bluetooth™ wireless technologies. Thus, the communication can be a predefined structure as with a conventional network or simply an ad hoc communication between at least two devices.

Wi-Fi, or Wireless Fidelity, allows connection to the Internet from home, in a hotel room, or at work, without wires. Wi-Fi is a wireless technology similar to that used in a cell phone that enables such devices, e.g., computers, to send and receive data indoors and out; anywhere within the range of a base station. Wi-Fi networks use radio technologies called IEEE 802.11(a, b, g, etc.) to provide secure, reliable, fast wireless connectivity. A Wi-Fi network can be used to connect computers to each other, to the Internet, and to wired networks (which use IEEE 802.3 or Ethernet). Wi-Fi networks operate in the unlicensed 2.4 and 5 GHz radio bands, at an 11 Mbps (802.11a) or 54 Mbps (802.11b) data rate, for example, or with products that contain both bands (dual band), so the networks can provide real-world performance similar to the basic 10BaseT wired Ethernet networks used in many offices.

Figure 12:
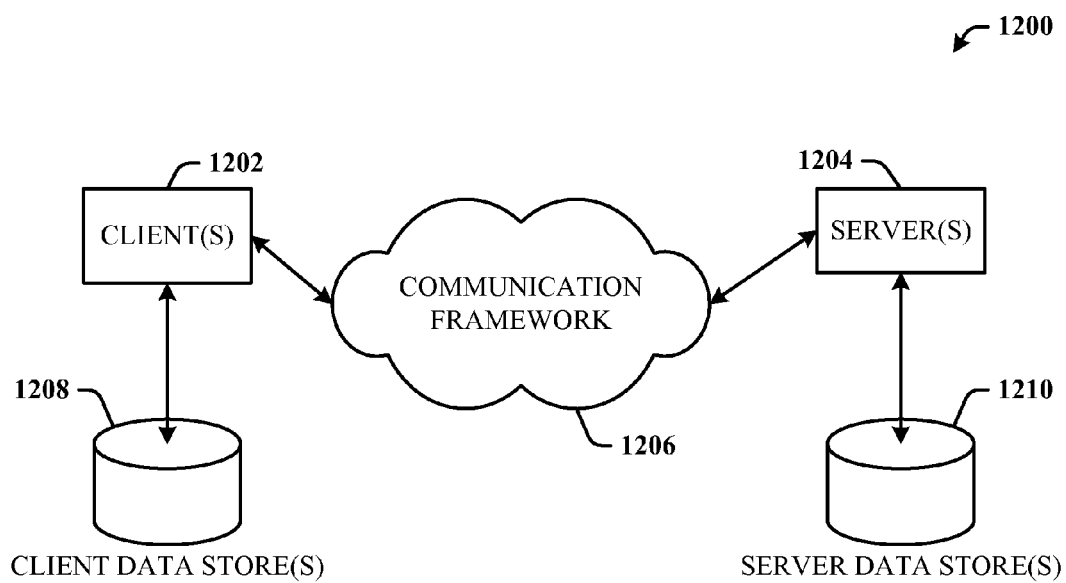
FIG. 12 illustrates a schematic block diagram of an exemplary computing environment operable to execute the disclosed embodiments.

Referring now to FIG. 12, there is illustrated a schematic block diagram of an exemplary computing environment 1200 in accordance with the various embodiments. The system 1200 includes one or more client(s) 1202. The client(s) 1202 can be hardware and/or software (e.g., threads, processes, computing devices). The client(s) 1202 can house cookie(s) and/or associated contextual information by employing the various embodiments, for example.

The system 1200 also includes one or more server(s) 1204. The server(s) 1204 can also be hardware and/or software (e.g., threads, processes, computing devices). The servers 1204 can house threads to perform transformations by employing the various embodiments, for example. One possible communication between a client 1202 and a server 1204 can be in the form of a data packet adapted to be transmitted between two or more computer processes. The data packet may include a cookie and/or associated contextual information, for example. The system 1200 includes a communication framework 1206 (e.g., a global communication network such as the Internet) that can be employed to facilitate communications between the client(s) 1202 and the server(s) 1204.

Communications can be facilitated through a wired (including optical fiber) and/or wireless technology. The client (s) 1202 are operatively connected to one or more client data store(s) 1208 that can be employed to store information local to the client(s) 1202 (e.g., cookie(s) and/or associated contextual information). Similarly, the server(s) 1204 are operatively connected to one or more server data store(s) 1210 that can be employed to store information local to the servers 1204.

What has been described above includes examples of the various embodiments. It is, of course, not possible to describe every conceivable combination of components or methodologies for purposes of describing the various embodiments, but one of ordinary skill in the art may recognize that many further combinations and permutations are possible. Accordingly, the subject specification intended to embrace all such alterations, modifications, and variations that fall within the spirit and scope of the appended claims.

In particular and in regard to the various functions performed by the above described components, devices, circuits, systems and the like, the terms (including a reference to a "means") used to describe such components are intended to correspond, unless otherwise indicated, to any component which performs the specified function of the described component (e.g., a functional equivalent), even though not structurally equivalent to the disclosed structure, which performs the function in the herein illustrated exemplary aspects. In this regard, it will also be recognized that the various aspects include a system as well as a computer-readable medium having computer-executable instructions for performing the acts and/or events of the various methods.

In addition, while a particular feature may have been disclosed with respect to only one of several implementations, such feature may be combined with one or more other features of the other implementations as may be desired and advantageous for any given or particular application. To the extent that the terms "includes," and "including" and variants thereof are used in either the detailed description or the claims, these terms are intended to be inclusive in a manner similar to the term "comprising." Furthermore, the term "or" as used in either the detailed description or the claims is meant to be a "non-exclusive or".

What is claimed is:

1. A system that facilitates goal seeking in tabular data, comprising:
a processor;
system memory;
a receiver component that receives a desired goal based on tabular data, the goal comprising a substantially increased likelihood that the tabular data of a target column has a target value, wherein the receiver component is configured to receive and process both categorical goals comprising at least a target column that contains a finite set of categorical values and continuous goals comprising the target column that contains values in a range or interval;
an optimization component that optimizes goal seeking for at least one degree of freedom, wherein optimizing includes determining patterns for a selected row that determine a value of a target column as a function of the other columns within the tabular data, the determined patterns providing at least one row value that increases the likelihood of reaching the desired goal in the target column, the row values being inferred using probabilistic inference, wherein the probabilistic inference includes computing a probability distribution over states of interest based on a consideration of data and events of rows other than the selected row, wherein the row values are based on the probability they yield for the goal value if categorical goals were received and are based on the closest estimation to the goal if continuous goals were received; and
an output component that presents recommended actions within the tabular data to achieve the desired goal.

2. The system of claim 1, further comprising a measurement component that measures a degree of confidence that the recommended action will yield the desired goal.

3. The system of claim 2, the measurement component measures the degree of confidence directly from a predictive model generated by the optimization component.

4. The system of claim 1, the optimization component optimizes goal seeking utilizing at least one of a classification model, or an estimation model, or both.

5. The system of claim 1, the optimization component optimizes goal seeking for a plurality of degrees of freedoms utilizing a greedy approach.

6. The system of claim 1, the output component presents an error message if the optimization component can not optimize the goal seeking.

7. The system of claim 1, the optimization component describes the target column values with the function:

$$F=(Col1 \text{Values} \times Col2 \text{Values} \times \ldots \times ColN \text{ values}) \rightarrow (\text{targetColValues}).$$

8. The system of claim 1, the optimization component further identifies fixed factors that should not be optimized.

9. The system of claim 1, the optimization component is executed on a server independent of the location of the tabular data.

10. The system of claim 1, the tabular data is contained in a spreadsheet application.

11. The system of claim 1, the tabular data is contained in an XML application.

12. A computer-implemented dynamic goal method for dynamic goal seeking in tabular data, comprising:
receiving an input that includes a desired goal expressed within tabular data, the goal comprising a substantially increased likelihood that the tabular data of a target column has a target value, wherein receiving includes receiving and processing both categorical goals comprising at least a target column that contains a finite set of categorical values and continuous goals comprising the target column that contains values in a range or interval;
uploading the tabular data as at least one rowset parameter; and
building a predictive model based in part on the at least one rowset parameter and the desired goal, wherein the desired goal is optimized, the optimizing includes determining patterns for a selected row that determine a value of a target column as a function of the other columns within the tabular data, the determined patterns providing a row value that increases the likelihood of reaching the desired goal in the target column, the row values being inferred using probabilistic inference, wherein the probabilistic inference includes computing a probability distribution over states of interest based on a consideration of data and events of rows other than the selected row, wherein the row values are based on the probability they yield for the goal value if categorical goals were received and are based on the closest estimation to the goal if continuous goals were received.

13. The method of claim 12, building a predictive model comprising utilizing a classification model or an estimation model.

14. The method of claim 12, further comprising:
ascertaining at least one value for each column contained in the tabular data;
exploring possible combinations for each column; and
determining if the desired goal is achievable.

15. The method of claim 14, further comprising returning at least one combination that maximizes the probability if the desired goal is achievable.

16. The method of claim 14, further comprising sending an error message if the desired goal is not achievable.

17. The method of claim 12, further comprising identifying fixed factors and eliminating the fixed factors from the built predictive model.

18. A computer executable system including a processor and system memory that provides recommends actions to achieve a goal relating to tabular data, comprising:

means for receiving a desired goal represented by a plurality of columns and a plurality of rows, the goal comprising a substantially increased likelihood that the tabular data of a target column has a target value, wherein receiving includes receiving and processing both categorical goals comprising at least a target column that contains a finite set of categorical values and continuous goals comprising the target column that contains values in a range or interval;

means for evaluating the plurality of columns and the plurality of rows, the evaluating including optimizing the desired goal, wherein the optimizing includes determining patterns for a selected row that determine a value of a target column as a function of the other columns within the tabular data, the determined patterns providing a row value that increases the likelihood of reaching the desired goal in the target column, the row values being inferred using probabilistic inference, wherein the probabilistic inference includes computing a probability distribution over states of interest based on a consideration of data and events of rows other than the selected row, wherein the row values are based on the probability they yield for the goal if continuous goals were received;

means for determining a change to at least one of the plurality of columns or at least one of the plurality of row to achieved the desired result or both; and means for presenting the results of the determination.

19. The computer executable system of claim 18, further comprising means for determining a degree of confidence that the determined change will achieve the desired goal.

20. The computer executable system of claim 18, further comprising means for building at least one of a classification model or an estimation model or both the classification model and estimation model.

* * * * *

UNITED STATES PATENT AND TRADEMARK OFFICE
CERTIFICATE OF CORRECTION

| | | |
|---|---|---|
| PATENT NO. | : 7,788,200 B2 | Page 1 of 1 |
| APPLICATION NO. | : 11/670656 | |
| DATED | : August 31, 2010 | |
| INVENTOR(S) | : Ioan Bogdan Crivat et al. | |

It is certified that error appears in the above-identified patent and that said Letters Patent is hereby corrected as shown below:

In column 14, line 32, in Claim 12, before "method" delete "dynamic goal".

In column 15, line 10, in Claim 18, delete "recommends" and insert -- recommended --, therefor.

In column 16, line 11, in Claim 18, after "goal" insert -- value if categorical goals were received and are based on the closest estimation to the goal --.

Signed and Sealed this
Nineteenth Day of July, 2011

David J. Kappos
*Director of the United States Patent and Trademark Office*